United States Patent
Chattopadhyay et al.

(10) Patent No.: US 9,791,321 B2
(45) Date of Patent: Oct. 17, 2017

(54) 340 GHZ MULTIPIXEL TRANSCEIVER

(71) Applicant: California Institute of Technology, Pasadena, CA (US)

(72) Inventors: Goutam Chattopadhyay, Pasadena, CA (US); Ken B. Cooper, Glendale, CA (US); Emmanuel Decrossas, Pasadena, CA (US); John J. Gill, La Crescenta, CA (US); Cecile Jung-Kubiak, Pasadena, CA (US); Choonsup Lee, La Palma, CA (US); Robert Lin, Chino, CA (US); Imran Mehdi, South Pasadena, CA (US); Alejandro Peralta, Huntington Beach, CA (US); Theodore Reck, Pasadena, CA (US); Jose Siles, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 729 days.

(21) Appl. No.: 13/902,529

(22) Filed: May 24, 2013

(65) Prior Publication Data

US 2015/0300884 A1   Oct. 22, 2015

Related U.S. Application Data

(60) Provisional application No. 61/651,359, filed on May 24, 2012.

(51) Int. Cl.
| | | |
|---|---|---|
| *G01J 5/20* | (2006.01) | |
| *G01S 7/02* | (2006.01) | |
| *G01S 13/88* | (2006.01) | |
| *G01S 13/89* | (2006.01) | |
| *G01J 5/00* | (2006.01) | |
| *G01S 7/03* | (2006.01) | |

(52) U.S. Cl.
CPC ........ *G01J 5/20* (2013.01); *G01S 7/02* (2013.01); *G01S 13/887* (2013.01); *G01S 13/89* (2013.01); *G01J 2005/0077* (2013.01); *G01J 2005/204* (2013.01); *G01S 7/036* (2013.01)

(58) Field of Classification Search
CPC ....................................................... G01J 5/20
See application file for complete search history.

(56) References Cited

U.S. PATENT DOCUMENTS

| | | | |
|---|---|---|---|
| 8,274,058 B1 * | 9/2012 | Wanke et al. ............ | 250/370.12 |
| 2014/0147192 A1 * | 5/2014 | Jung-Kubiak et al. ......... | 403/27 |

OTHER PUBLICATIONS

Sheen, D., et al., "Active Millimeter-Wave Standoff and Portal Imaging Techniques for Personnel Screening," in Technologies for Homeland Security, HST '09. IEEE Conference, May 2009, pp. 440-447.

(Continued)

*Primary Examiner* — David Porta
*Assistant Examiner* — Hugh H Maupin
(74) *Attorney, Agent, or Firm* — Gates & Cooper LLP

(57) ABSTRACT

A multi-pixel terahertz transceiver is constructed using a stack of semiconductor layers that communicate using vias defined within the semiconductor layers. By using a stack of semiconductor layers, the various electrical functions of each layer can be tested easily without having to assemble the entire transceiver. In addition, the design allows the production of a transceiver having pixels set 10 mm apart.

13 Claims, 11 Drawing Sheets

(56) References Cited

OTHER PUBLICATIONS

Cooper, K.B., et al., "THz Imaging Radar for Standoff Personnel Screening", IEEE Transactions on Terahertz Science and Technology, Sep. 2011, pp. 169-182, vol. 1, No. 1.
Llombart, N., et al., "Time-Delay Multiplexing of Two Beams in a Terahertz Imaging Radar", IEEE Transactions on Microwave Theory and Techniques, Jul. 2010, pp. 1999-2007, vol. 58, No. 7.
Mehdi, I., et al., "Radiometer-on-a-chip: A path towards super-compact Submillimeter-wave imaging arrays", Proceedings of the SPIE, ser. Terahertz Physics, Devices, and Systems IV: Advanced Applications in Industry and Defense, Apr. 2010, pp. 767105-767109, vol. 7671.
ThruVison Systems Limited, "Standoff Object Detection", Digital Barriers Feb. 2012.

\* cited by examiner (b)

(a)

340 GHZ MULTIPIXEL TRANSCEIVER

CROSS-REFERENCE TO RELATED APPLICATIONS

This application claims priority to and the benefit of U.S. provisional patent application Ser. No. 61/651,359, filed May 24, 2012, which application is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

FIELD OF THE INVENTION

The invention relates to terahertz imaging in general and particularly to multi-pixel imaging systems.

BACKGROUND OF THE INVENTION

Person-borne concealed weapon or contraband detection at long distance is an urgent national security need, but presently there is no adequate solution available. For example, plastic objects, such as handguns, may not be detected by conventional metal detectors. Terahertz radiation is of great interest for this application because of its ability to penetrate clothing and provide resolution on the order of millimeters. Although this does not have the resolution of X-rays, the energy is low enough to not be ionizing, avoiding any health concerns. Two primary approaches are used from imaging at these frequencies, active and passive. Passive imagers capture differences in black body temperatures between a person an any concealed items. See, for example, Thruvison Systems Limited, "ThruVision standoff people screening—Digital Barriers" February 2012. These systems are limited in sensitivity due to the minor temperature and emissivity differences that define the image and improvements in image quality are primarily made by cryogenically cooling the system. These systems can also be large (e.g., having volumes approaching a cubic meter) and heavy (e.g., having masses of tens of kilograms).

In contrast, active imagers paint the target with a low-power terahertz signal and form the image from the energy reflected from the target. For most security screening applications, near video rates (>4 Hz) are required to allow for adequate security checkpoint throughput. To scan, the active radar mechanically steers a single beam across the target area in a serpentine pattern. Currently this mechanical scanning limits the frame rate of the system to approximately 1 fps for a 0.4 m×0.4 m target area. This is set by the mechanical behavior of the scanning mirror, which begins to deteriorate the angular accuracy of the optical system when the mirror is scanned faster. To overcome this limitation, an array of transceivers can be used to reduce the required angular rotation in one of the scanning dimensions. If an N-transceiver array is used, the frame rate can be increased by a factor of N since the angle required to scan the mirror is reduced.

There is a need for improved multi-pixel terahertz imaging systems that are inexpensive and convenient to fabricate.

SUMMARY OF THE INVENTION

According to one aspect, the invention features a multi-pixel terahertz transceiver. The multi-pixel terahertz transceiver comprises a plurality of layers of a semiconductor in a stacked array, each of the plurality of layers of the semiconductor in the stacked array configured to perform less than all the functions of the transceiver, each of the plurality of layers of a semiconductor in the stacked array when in an assembled structure in electromagnetic communication with at least one other of the plurality of layers of a semiconductor in the stacked array; a local oscillator in electrical communication with the plurality of layers of the semiconductor in the stacked array and configured to provide an oscillation signal for each of a transmitted signal and a received signal; a biasing terminal for applying biasing signals in electrical communication with at least one of the plurality of layers of the semiconductor in the stacked array; an IF output terminal in electrical communication with at least one of the plurality of layers of the semiconductor in the stacked array; and an antenna array configured to transmit and to receive a plurality of terahertz signals.

In one embodiment, at least one of the plurality of layers of a semiconductor in a stacked array comprises a silicon active element.

In another embodiment, at least one of the plurality of layers of a semiconductor in a stacked array comprises a gallium arsenide active element.

In yet another embodiment, the electromagnetic communication between the layers of a semiconductor is by way of one or more vias defined in each of the layers of a semiconductor.

In still another embodiment, the layers of a semiconductor are aligned using silicon alignment pins.

In a further embodiment, the layers of a semiconductor are configured to be tested individually when not assembled in the stacked array.

In yet a further embodiment, the transceiver provides a pixel spacing of 10 mm.

According to another aspect, the invention relates to a method of manufacturing a multi-pixel terahertz transceiver. The method comprises the steps of: providing a plurality of layers of a semiconductor, each of the plurality of layers of the semiconductor configured to perform less than all the functions of the transceiver, assembling the plurality of layers of a semiconductor in a stacked array, wherein each of the plurality of layers of a semiconductor in the stacked array is in electromagnetic communication with at least one other of the plurality of layers of a semiconductor in the stacked array; providing a local oscillator in electrical communication with the plurality of layers of the semiconductor in the stacked array, the local oscillator configured to provide an oscillation signal for each of a transmitted signal and a received signal; providing a biasing terminal for applying biasing signals in electrical communication with at least one of the plurality of layers of the semiconductor in the stacked array; providing an IF output terminal in electrical communication with at least one of the plurality of layers of the semiconductor in the stacked array; and providing an antenna array configured to transmit and to receive a plurality of terahertz signals.

In one embodiment, at least one of the plurality of layers of a semiconductor in a stacked array comprises a silicon active element.

In another embodiment, at least one of the plurality of layers of a semiconductor in a stacked array comprises a gallium arsenide active element.

In yet another embodiment, the electromagnetic communication between the layers of a semiconductor is by way of one or more vias defined in each of the layers of a semiconductor.

In still another embodiment, the layers of a semiconductor are aligned using silicon alignment pins.

In a further embodiment, at least one of the layers of a semiconductor is tested individually when not assembled in the stacked array.

In yet a further embodiment, the transceiver provides a pixel spa The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Heterodyne terahertz (0.3-3 THz) imaging systems are currently limited to single or a low number of pixels. Significant improvements in imaging sensitivity and speed can be achieved by replacing single pixel systems with an array of detectors. We describe an array topology that is based on the micromachining of silicon. This technique fabricates the array's package and waveguide components by plasma etching of silicon, resulting in devices with precision surpassing that of current metal machining techniques. Using silicon increases the versatility of the packaging, enabling a variety of orientations of circuitry within the device which increases circuit density and design options. The design of a two-pixel transceiver utilizing a stacked architecture is presented that achieves a pixel spacing of 10 mm. By only allowing coupling from the top and bottom of the package the design can readily be arrayed in two dimensions with a spacing of 10 mm×18 mm. It is believed that this fabrication technology will provide arrays having larger numbers of pixels.

An active radar developed at the NASA Jet Propulsion Laboratory operates in a frequency-modulated continuous-wave mode (FMCW). By acquiring high resolution time-of-flight measurements between the system and target a virtual "patdown" at a standoff distance of 25 m is obtained. See, for example, K. Cooper, R. Dengler, N. Llombart, B. Thomas, G. Chattopadhyay, and P. Siegel, "The imaging radar for standoff personnel screening," *Terahertz Science and Technology, IEEE Transactions on*, vol. 1, no. 1, pp. 169-182, September 2011. Previous generations of the JPL radar have operated around 670 GHz. We now describe a new frontend transceiver design operating at 340 GHz. Although this lower frequency has a lower resolution than a 670 GHz device, the present transceiver provides greater clothing penetration and higher transmitter power with a simpler transceiver design. See, for example, D. Sheen, D. McMakin, T. Hall, and R. Severtsen, "Active millimeter-wave standoff and portal imaging techniques for personnel screening," in *Technologies for Homeland Security, 2009. HST '09. IEEE Conference on*, May 2009, pp. 440-447.

Figure 1B:
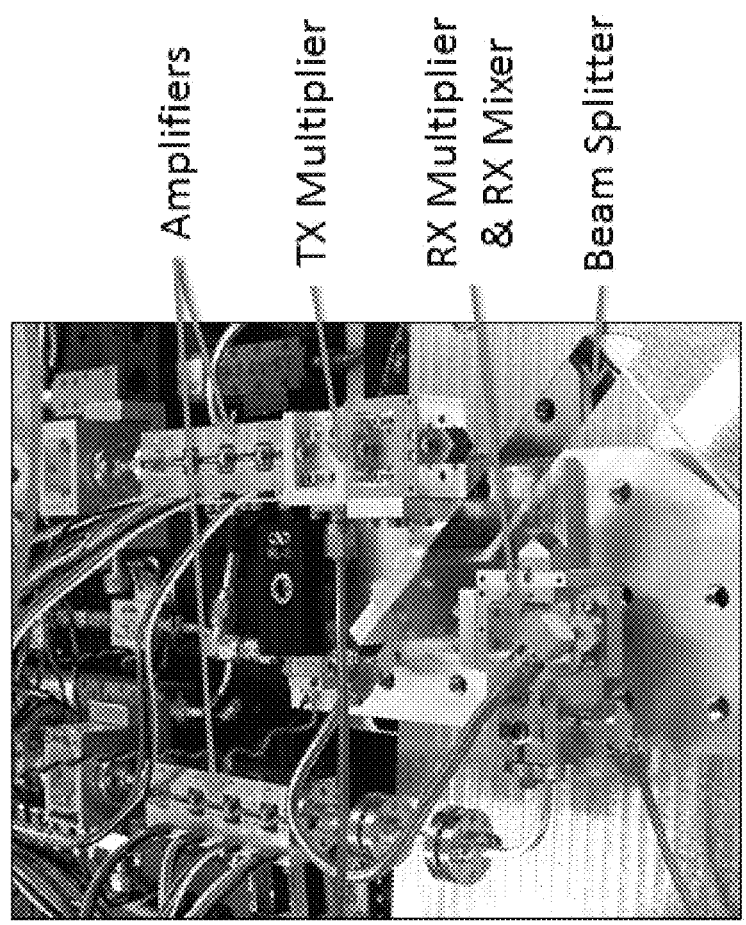
FIG. 1B is an image of a prior art single pixel transceiver front-end constructed with metal components.
Figure 1A:
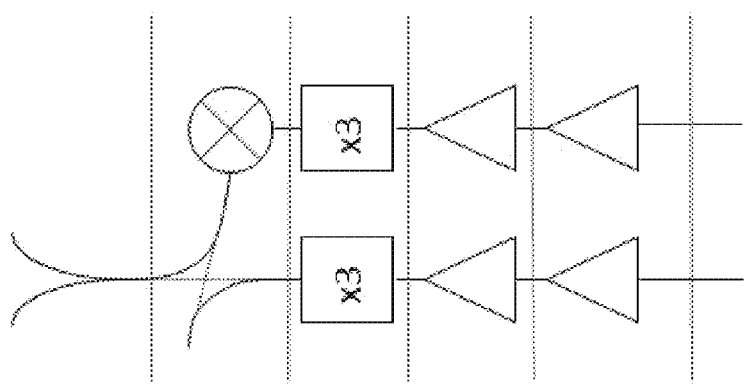
FIG. 1A is a schematic diagram of a prior art single pixel transceiver front-end.
Figures 2A, 2B:
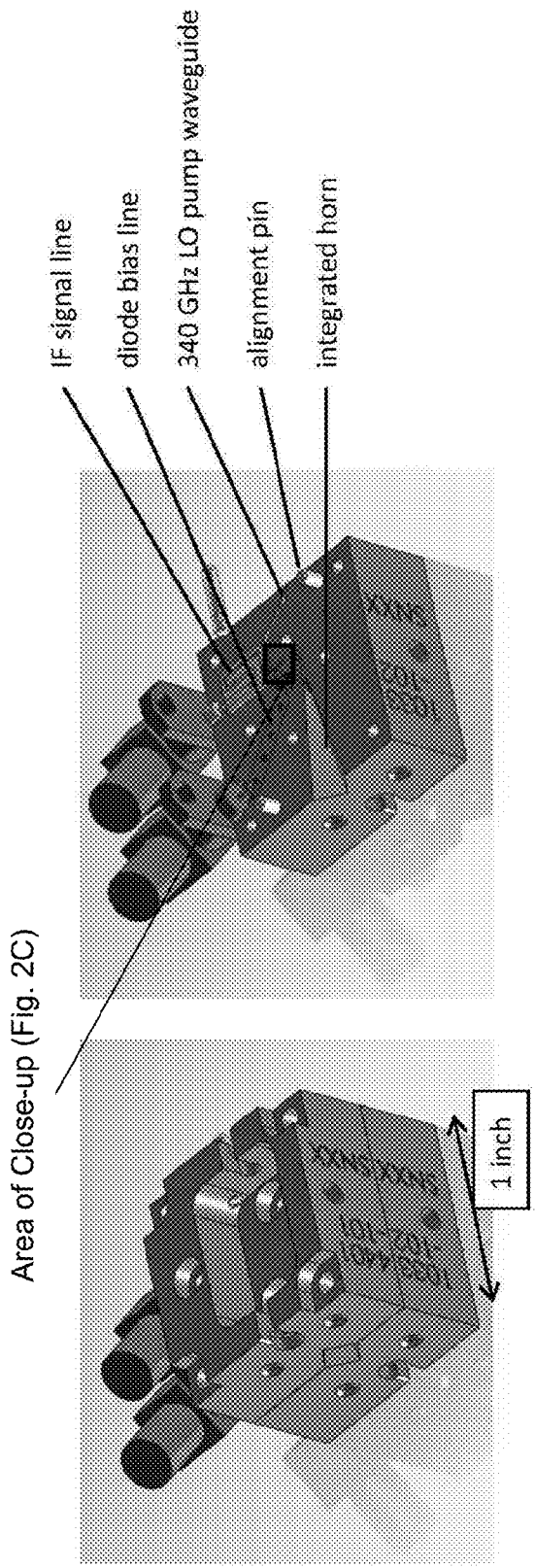
FIG. 2A is a diagram depicting an overview of transceiver constructed according to principles of the invention.
FIG. 2B is a cutaway view of the device in FIG. 2A showing features of the device.
Figure 2C:
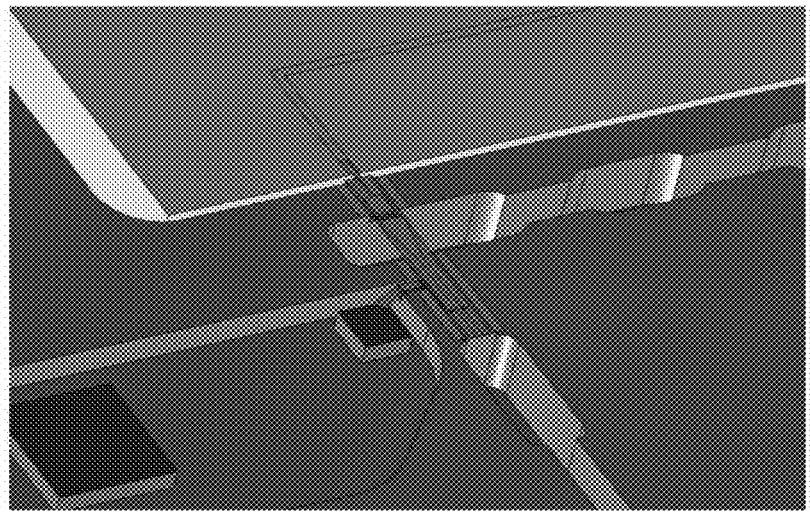
FIG. 2C is a close-up diagram of a portion of the device shown in FIG. 2B illustrating the fine impedance matching structures for a GaAs diode.
Figure 2D:
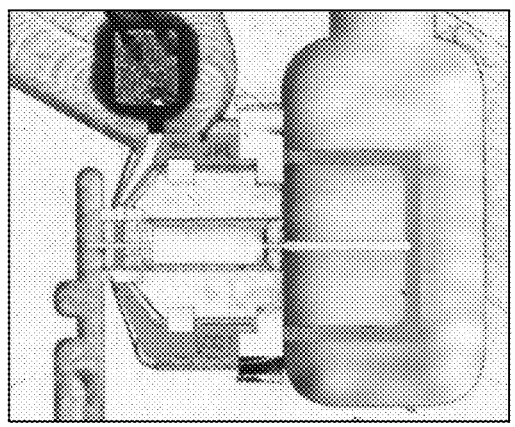
FIG. 2D is an image showing the diode device mounted in the metal split block shown in FIG. 2B.

Fabrication of an array of transceivers with sufficient pixel density to efficiently couple to a compact optical system is not a trivial task at submillimeter wavelengths. For example, FIG. 1A shows a schematic diagram of the single beam transceiver frontend. The transceiver is fed an LO with a frequency of 108-118 GHz which is amplified to 100 mW. This amplified signal drives triplers that produce approximately 10 mW of output power. The output of one of these triplers is the transmitted signal and the other provides the LO for the receive mixer. Previously, each of these components has been packaged individually into metal machined blocks, as shown in FIG. 1B. FIG. 1B is an image of a prior art single pixel transceiver front-end constructed with metal components. The total area of this front-end is 5×5 inches. This results in a large system, with pixel spacing being limited by the diameter of the flanges that couple the devices (approximately 2 cm). Clearly, an array of many transceivers based on modular components would not be practical.

The transceiver components preferably should be integrated into a single package to create an array of sufficient pixel density. Metal machining could be used, but suffers for several drawbacks. First, CNC milling which are used to form the passive structures is an expensive, serial procedure. 2-D arrays are difficult to design, since signals must be routed through the split in the middle of the metal package. Finally, with all the components cascaded in a single package, testing of each stage individually becomes impossible.

Stacked Silicon Architecture

In the devices described herein, silicon micromachining is used to produce packaging for the transceiver array that avoids many of these problems. Silicon micromachining applies a microelectronics-based fabrication technique to etch the waveguide components from silicon wafers. Since this is a batch process, multiple devices can be produced with the same effort, reducing costs and production time. All the features are photolithographically defined resulting in higher precision and uniformity compared with CNC milling. See, for example, I. Mehdi, B. Thomas, C. Lee, G. Chattopadhyay, R. Lin, E. Schlecht, A. Peralta, J. Gill, K. Cooper, N. Llombart, and P. Siegel, "Radiometer-on-a-chip: a path toward super-compact submillimeter-wave imaging arrays," in *Proceedings of the SPIE*, ser. Terahertz Physics, Devices, and Systems IV: Advanced Applications in Industry and Defense, vol. 7671, April 2010, pp. 767105-767109. Finally, with the packaging material being a semiconductor, bias circuitry and IF routing can be integrated into the packaging, increasing the circuit density and simplifying assembly.

Figures 3A, 3B, 3C:
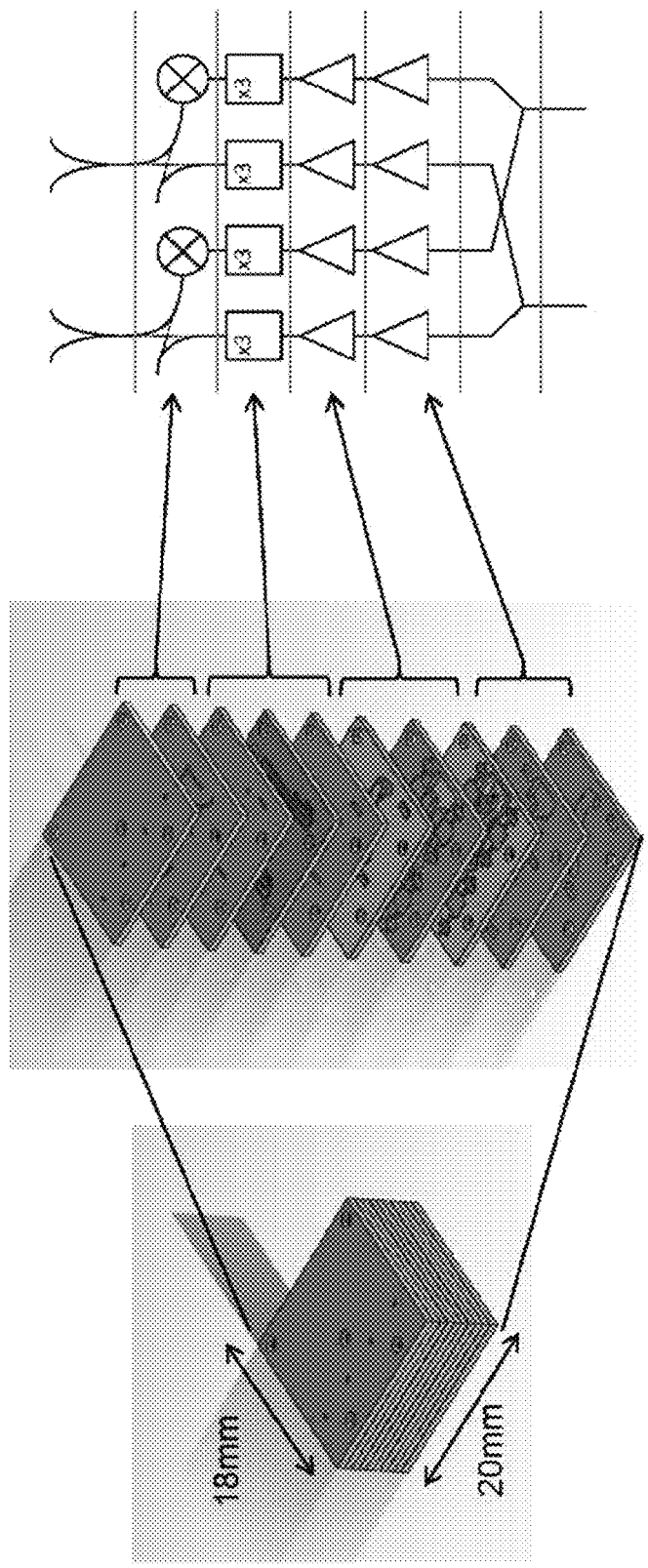
FIG. 3A is a schematic diagram illustrating how a plurality of wafer components are assembled as part of a multipixel transceiver constructed according to principles of the invention.
FIG. 3B is an exploded view of the layers in FIG. 3A.
FIG. 3C is a schematic diagram illustrating the circuit elements by layer.

In order to provide an architecture that can support 2-D pixel arrays in a compact format, 3-D integration is applied to minimize the area in addition to the length of each pixel. FIG. 3A shows the wafer stack-up of an exemplary two-pixel transceiver. Many benefits are gained by stacking layers of silicon. By separating each functional component in a single layer the fabrication of each layer is simplified. This stackable architecture allows for testing of each stage, significantly reducing troubleshooting times. Most importantly, integration of the bias and IF lines through vias defined in each of the semiconductor layers in the wafer stack eliminates routing these signals out the sides of the assembly. This enables the design to be arrayed in two axes so that transceivers with higher pixel counts are expected to be provided. FIG. 3B is an exploded view of the layers in FIG. 3A. FIG. 3C is a schematic diagram illustrating the circuit elements by layer. In some embodiments, the layers are aligned using silicon alignment pins, which have been described in greater detail in co-pending U.S. patent application Ser. No. 13/871,830.

Figure 4:
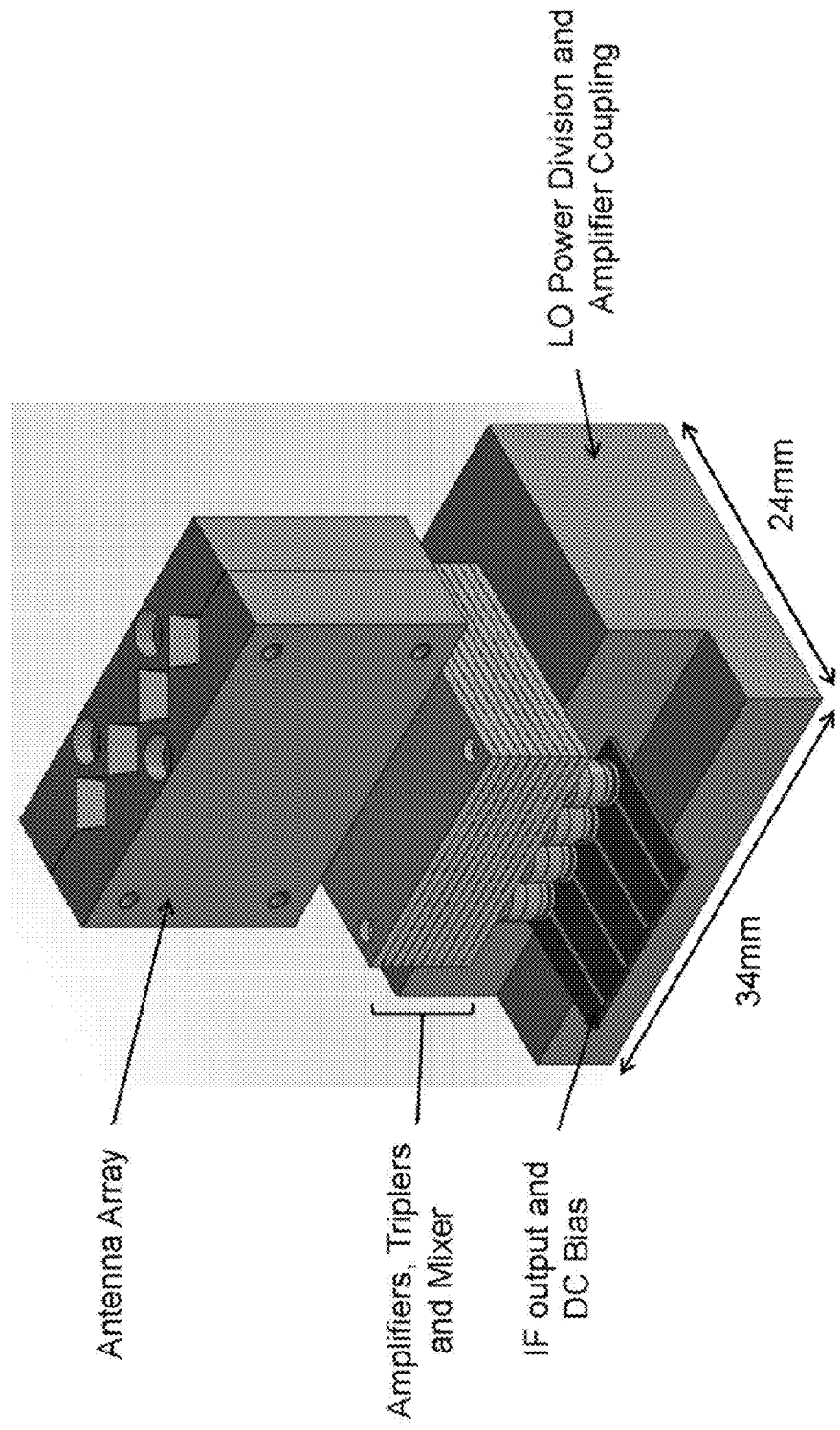
FIG. 4 is a schematic diagram showing a complete 2-pixel transceiver according to principles of the invention including the LO power division fixture, IF and biasing PCB, silicon stack and antenna array.

FIG. 4 is a schematic diagram showing a complete 2-pixel transceiver according to principles of the invention including the LO power division fixture, IF and biasing PCB, silicon stack and antenna array. As is seen in FIG. 4, the entire two pixel array with all the supporting fixtures which couple to and from the silicon stack is provided. The transceiver is fed two LO signals through LO power division fixture, which incorporates Y-junctions for both transmit and receive channels so that only two waveguide flanges are required to couple to the 2-pixel array. This fixture is relatively large due to these two WR-8 UG-386 flanges, but would only need to be as large as the silicon array for higher pixel counts.

Surface mount GPPO® connectors are used for routing of the bias and IF signals. This type of push on connector is chosen because of its small size (3.5 mm diameter). Its tolerance to axial misalignments enables direct connection to a PCB board, simplifying the routing of the signals to the array. GPPO® connectors are available from Corning Gilbert, Inc., 5310 Camelback Road, Glendale, Ariz. 85301 USA.

Figures 5A, 5B:
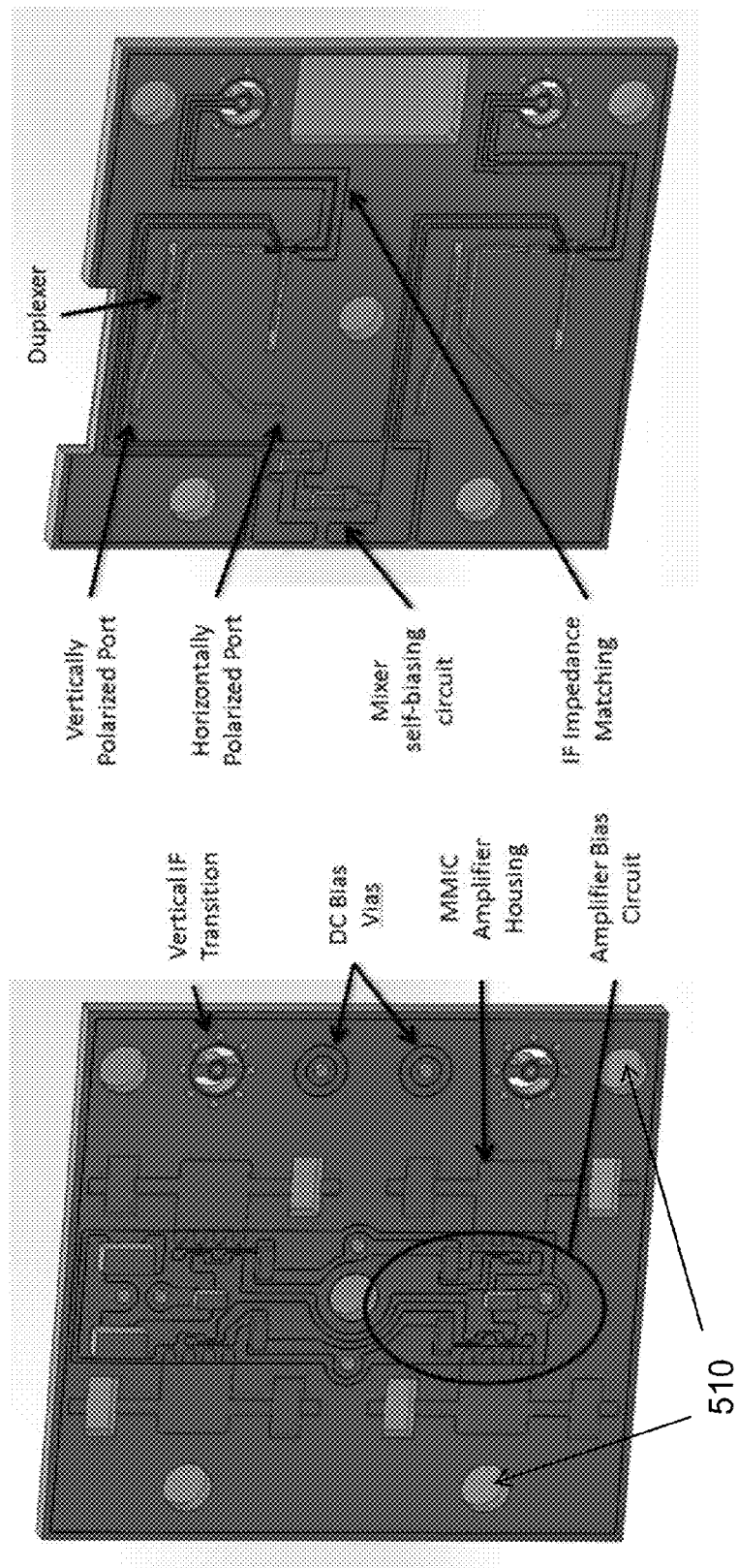
FIG. 5A is a drawing showing one surface of a layer that provides a power amplifier housing with integrated bias circuitry.
FIG. 5B is a drawing showing one surface of the receiver layer with the mixer, IF impedance matching, biasing and RF duplexer.

As mentioned earlier, the bias circuitry can be fabricated as part of the packaging to decrease the pixel spacing of the array. FIG. 5A shows the layer that houses the MMIC power amplifier and the bias circuitry with surface mount components. Vias between the front and back of each layer provide routing of drain and gate voltages for four amplifiers. Bolt holes 510 are shown through which fasteners such as bolts 1010 of FIG. 10A can be passed to hold an assembled stack of layers together.

FIG. 5B is a drawing showing the receiver layer with the mixer, IF impedance matching, biasing and RF duplexer. Since the transmit and receive signals must be duplexed by a 3-dB hybrid, the fourth port of the hybrid is coupled out of the stack into an orthogonal polarization instead of a matched load. This allows for recovering half the transmit power using time-delay multiplexing and doubles the effective pixel count of the system. See, for example, N. Llombart, K. Cooper, R. Dengler, T. Bryllert, G. Chattopadhyay, and P. Siegel, "Time-delay multiplexing of two beams in a terahertz imaging radar," *Microwave Theory and Techniques, IEEE Transactions on*, vol. 58, no. 7, pp. 1999-2007, July 2010.

FIG. 5B shows the IF output of the mixer being coupled to a vertical transition. This routes the IF output of the mixer to the bottom of the silicon stack.

Figure 6:
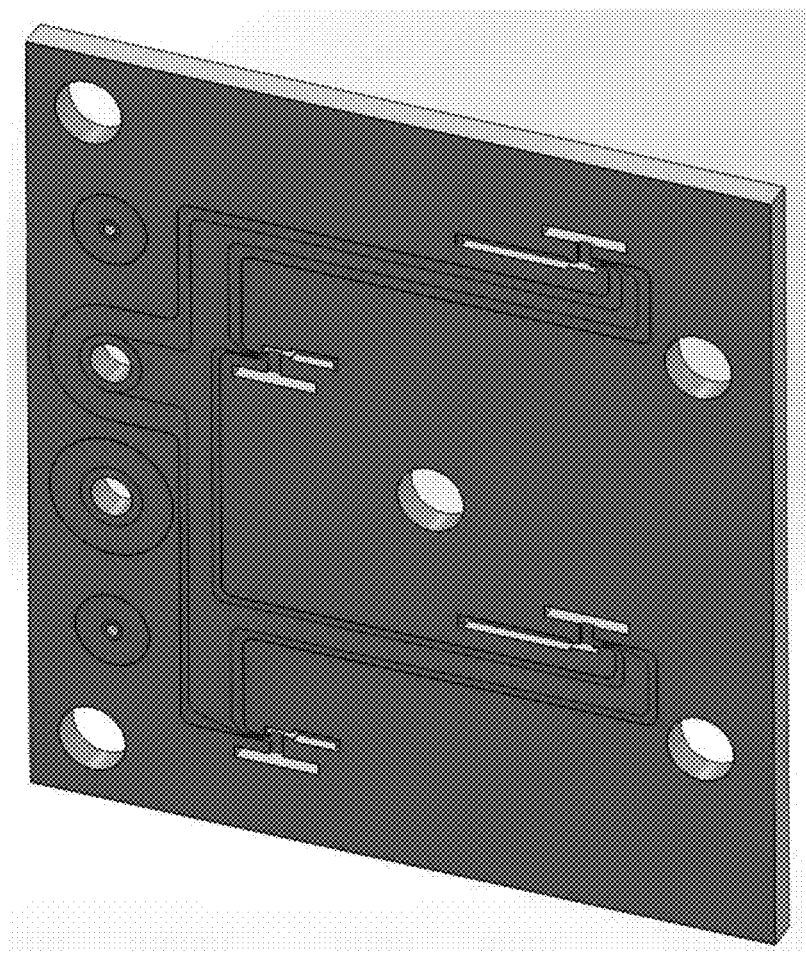
FIG. 6 is a drawing showing one surface of a layer comprising a tripler wafer.

FIG. 6 is a drawing showing one surface of a layer comprising a tripler wafer.

Figure 7:
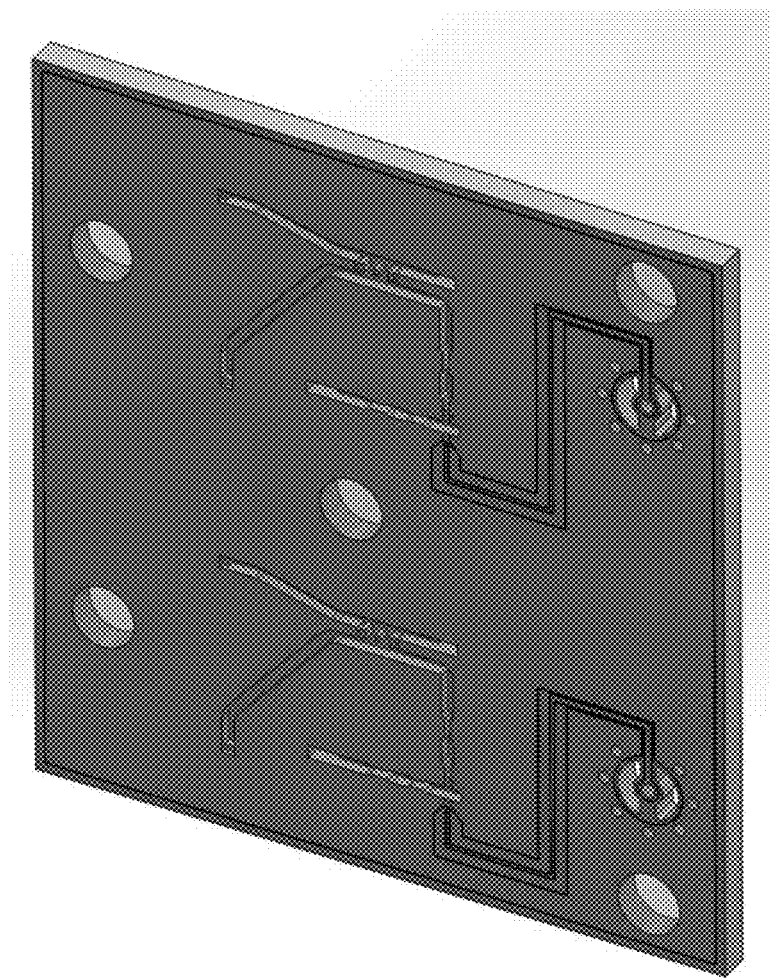
FIG. 7 is a drawing showing one surface of a layer comprising a mixer wafer.

FIG. 7 is a drawing showing one surface of a layer comprising a mixer wafer.

Figure 8:
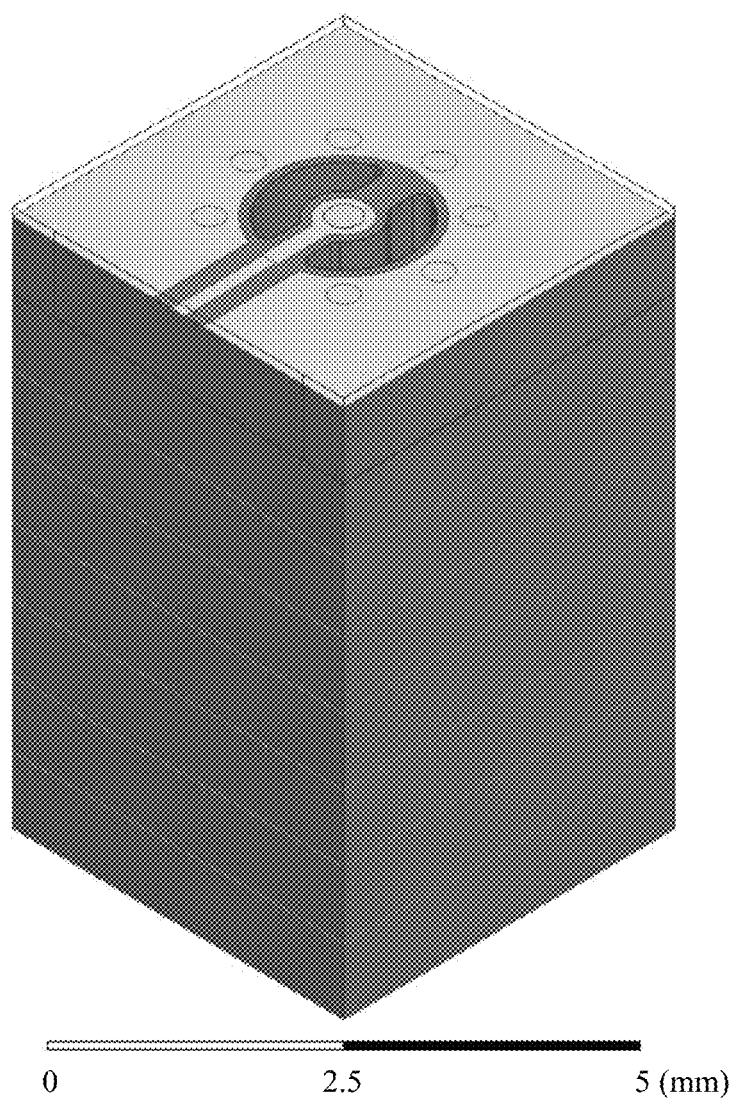
FIG. 8 shows the design of a device comprising eight 800 μm thick silicon wafers with IF vertical transitions.
Figure 9:
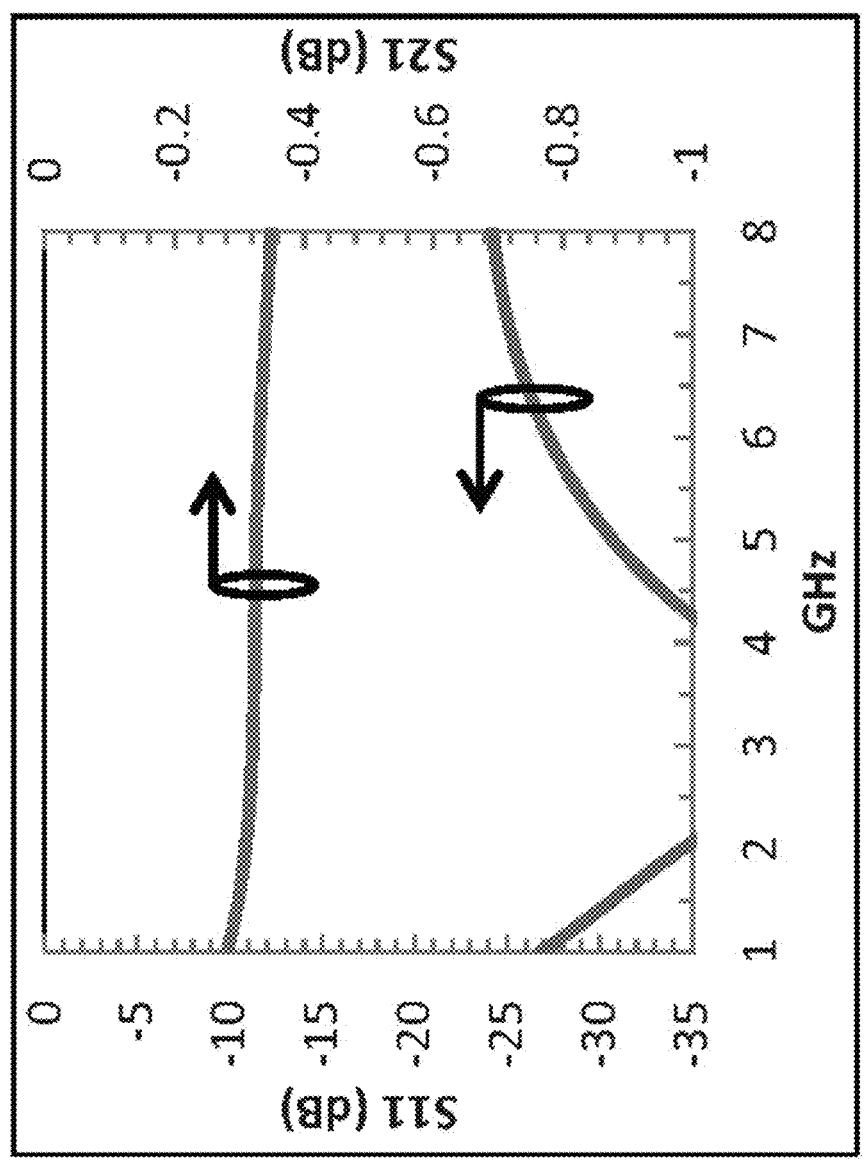
FIG. 9 is a graph of simulation results of this vertical transition through the eight 800 μm thick silicon wafer design of FIG. 8.

FIG. 8 shows the design of a device comprising eight 800 μm thick silicon wafers. The design couples from a CPW transmission line to the quasi-coaxial mode formed by the gold plated thru-wafer vias. By etching away the majority of the silicon between the center and edge vias, a compact 50 Ohm coaxial line can be formed vertically through the wafer stack. This vertical transition directly couples to the GPPO® connector at the bottom of the assembly. Using a high resistivity substrate (2 kOhm-cm) the predicted loss is 17 dB/ft, which is comparable with coaxial cables of a similar diameter. FIG. 9 is a graph of simulation results of this vertical transition through eight 800 μm thick silicon wafers. The insertion loss is less than 0.4 dB through a silicon stack of eight 800 μm thick wafers with a resistivity of 2 kOhm-cm.

Figure 10A:
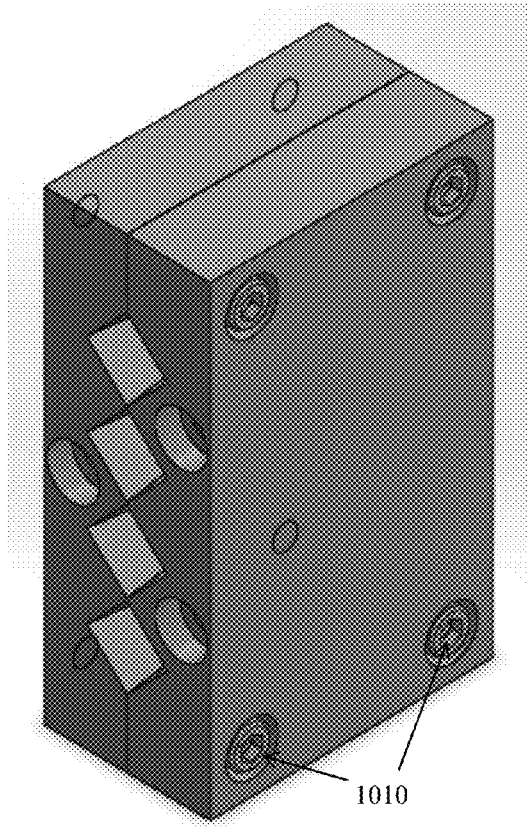
FIG. 10A is a drawing of a diagonal horn array having a 5 mm spacing, a 20 cm focal length and 21.5 dB directivity.

FIG. 10A is a drawing of a diagonal horn array antenna having a 5 mm spacing, a 20 cm focal length and 21.5 dB directivity. As can be seen in FIG. 10A, an entire stack can be held together with fasteners, such as the bolts 1010 shown in the drawing.

Figure 10B:
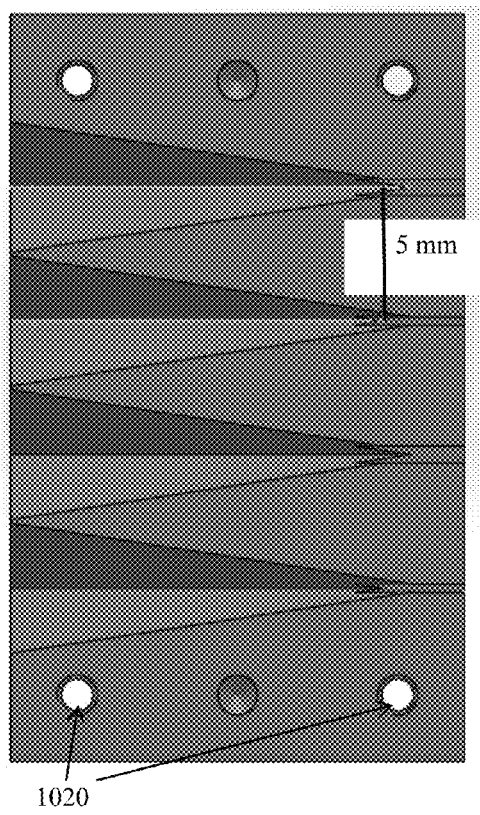
FIG. 10B is a cutaway drawing showing the centerplane structure of the diagonal horn array of FIG. 10A.

FIG. 10B is a cutaway drawing showing the centerplane structure of the diagonal horn array of FIG. 10A. Bolt holes 1020 are shown through which bolts 1010 of FIG. 10A can be passed.

A high circuit density package for submillimeter-wave arrays is constructed by combining a 3-D stacked architecture with silicon micromachining. This architecture is applied to the frontend transceiver components of an active imaging radar. A two-pixel transceiver design is presented that achieves a pixels spacing of 10 mm. The vertical routing through the silicon stack allows this design to be arrayed in two dimensions with a pixel spacing of 10 mm×18 mm.

Definitions

Unless otherwise explicitly recited herein, any reference to an electronic signal or an electromagnetic signal (or their equivalents) is to be understood as referring to a non-transitory electronic signal or a non-transitory electromagnetic signal.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A multi-pixel terahertz transceiver, comprising:
   a plurality of layers of a semiconductor in a stacked array, each of said plurality of layers of said semiconductor in said stacked array configured to perform less than all the functions of the transceiver, each of said plurality of said layers of a semiconductor configured to be tested individually when not assembled in said stacked array, each of said plurality of layers of a semiconductor in said stacked array when in an assembled structure in electromagnetic communication with at least one other of said plurality of layers of a semiconductor in said stacked array;
   a local oscillator in electrical communication with said plurality of layers of said semiconductor in said stacked array and configured to provide an oscillation signal for each of a transmitted signal and a received signal;
   a biasing terminal for applying biasing signals in electrical communication with at least one of said plurality of layers of said semiconductor in said stacked array;
   an IF output terminal in electrical communication with at least one of said plurality of layers of said semiconductor in said stacked array; and
   an antenna array configured to transmit and to receive a plurality of terahertz signals.

2. The multi-pixel terahertz transceiver of claim 1, wherein at least one of said plurality of layers of a semiconductor in a stacked array comprises a silicon active element.

3. The multi-pixel terahertz transceiver of claim 1, wherein at least one of said plurality of layers of a semiconductor in a stacked array comprises a gallium arsenide active element.

4. The multi-pixel terahertz transceiver of claim 1, wherein said electromagnetic communication between said layers of a semiconductor is by way of one or more vias defined in each of said layers of a semiconductor.

5. The multi-pixel terahertz transceiver of claim 1, wherein said layers of a semiconductor are aligned using silicon alignment pins.

6. The multi-pixel terahertz transceiver of claim 1, wherein said transceiver provides a pixel spacing of 10 mm.

7. A method of manufacturing a multi-pixel terahertz transceiver, comprising the steps of:
   providing a plurality of layers of a semiconductor, each of said plurality of layers of said semiconductor configured to perform less than all the functions of the transceiver, at least one of said layers of said semiconductor configured to be tested individually when not assembled in said stacked array;
   assembling said plurality of layers of a semiconductor in a stacked array, wherein each of said plurality of layers of a semiconductor in said stacked array is in electromagnetic communication with at least one other of said plurality of layers of a semiconductor in said stacked array;
   providing a local oscillator in electrical communication with said plurality of layers of said semiconductor in said stacked array, said local oscillator configured to provide an oscillation signal for each of a transmitted signal and a received signal;
   providing a biasing terminal for applying biasing signals in electrical communication with at least one of said plurality of layers of said semiconductor in said stacked array;
   providing an IF output terminal in electrical communication with at least one of said plurality of layers of said semiconductor in said stacked array; and
   providing an antenna array configured to transmit and to receive a plurality of terahertz signals.

8. The method of manufacturing a multi-pixel terahertz transceiver of claim 7, wherein at least one of said plurality of layers of a semiconductor in a stacked array comprises a silicon active element.

9. The method of manufacturing a multi-pixel terahertz transceiver of claim 7, wherein at least one of said plurality of layers of a semiconductor in a stacked array comprises a gallium arsenide active element.

10. The method of manufacturing a multi-pixel terahertz transceiver of claim 7, wherein said electromagnetic communication between said layers of a semiconductor is by way of one or more vias defined in each of said layers of a semiconductor.

11. The method of manufacturing a multi-pixel terahertz transceiver of claim 7, wherein said layers of a semiconductor are aligned using silicon alignment pins.

12. The method of manufacturing a multi-pixel terahertz transceiver of claim 7, wherein said transceiver provides a pixel spacing of 10 mm.

13. The multi-pixel terahertz transceiver of claim 1, further comprising:
   amplifier components in one of the layers; and
   mixer components in another of the layers.

* * * * *